Figure 1:
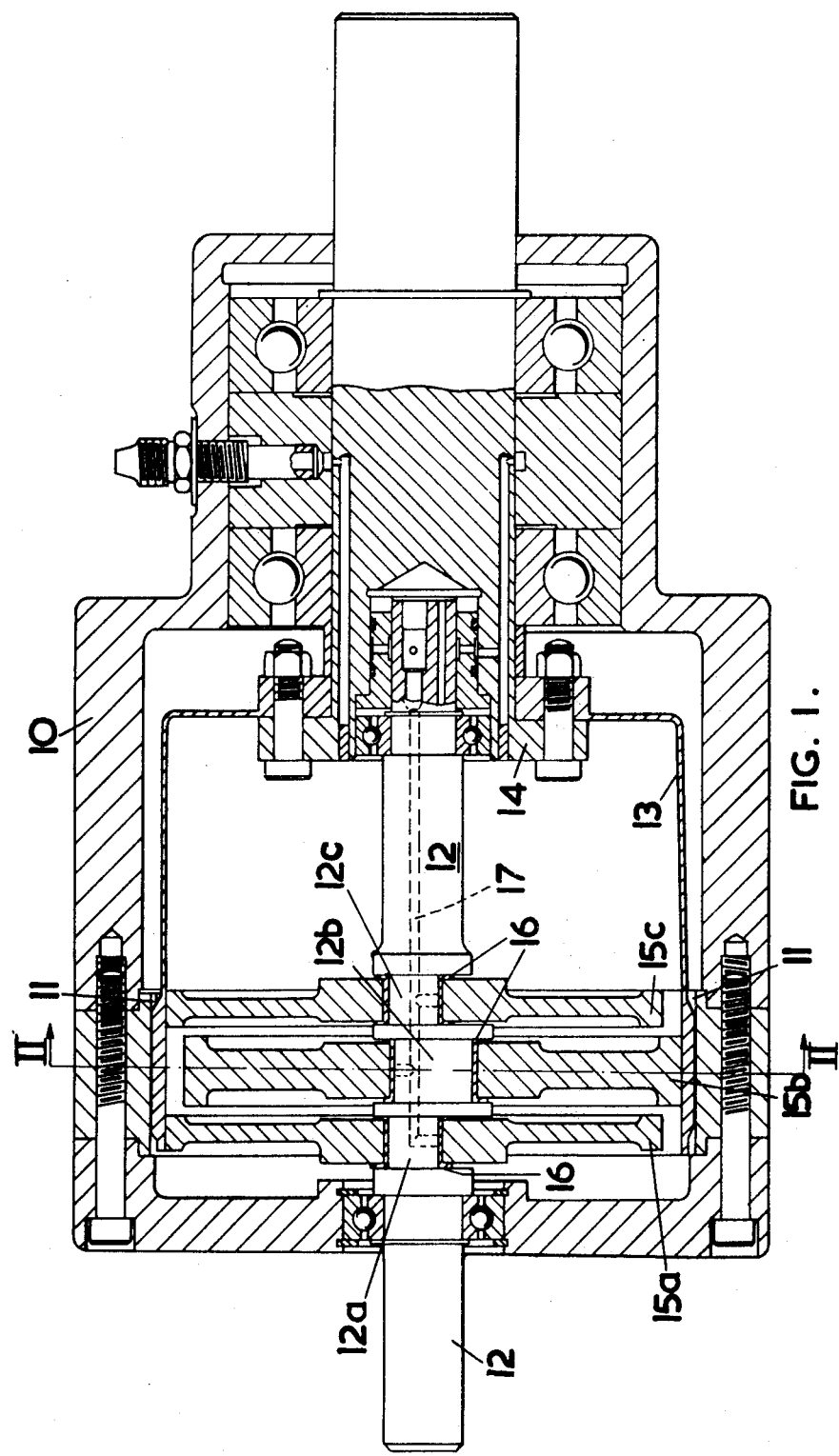

United States Patent [19]

Brighton

[11] 3,996,816
[45] Dec. 14, 1976

[54] HARMONIC DRIVES
[75] Inventor: Derek Keith Brighton, Farnham, England
[73] Assignee: The Secretary of State for Defence in Her Britannic Majesty's Government of the United Kingdom of Great Britain and Northern Ireland, London, England
[22] Filed: July 31, 1975
[21] Appl. No.: 600,830
[30] Foreign Application Priority Data
Aug. 1, 1974 United Kingdom ............ 34041/74
[52] U.S. Cl. .................................. 74/640; 74/462
[51] Int. Cl.² ................... F16H 33/00; F16H 55/06
[58] Field of Search .................... 74/640, 462, 460
[56] References Cited
UNITED STATES PATENTS

| | | | |
|---|---|---|---|
| 2,959,065 | 11/1960 | Musser | 74/640 X |
| 3,180,172 | 4/1965 | Leggatt | 74/462 |
| 3,371,552 | 3/1968 | Soper | 74/640 X |
| 3,415,143 | 12/1968 | Ishikawa | 74/640 |
| 3,555,929 | 1/1971 | Hossfeld | 74/640 |
| 3,667,320 | 6/1972 | Robinson | 74/640 |
| 3,709,055 | 1/1973 | Grove | 74/462 |
| 3,756,091 | 9/1973 | Miller | 74/462 X |
| 3,789,700 | 2/1974 | Cotreau | 74/640 X |

Primary Examiner—Leonard H. Gerin
Attorney, Agent, or Firm—Cameron, Kerkam, Sutton, Stowell & Stowell

[57] ABSTRACT

A harmonic drive in which the teeth on either or both of the flexspline and internal spline have a modified involute profile with a small contact angle when fully meshed, and considerable tip relief. The former preferably comprises three discs in line on an input shaft which is cranked to a small eccentricity, the center disc eccentricity being diametrically opposite that of the outside pair. Pressure lubricated plain bearings are advantageously used.

12 Claims, 7 Drawing Figures

HARMONIC DRIVES

The present invention relates to harmonic drives.

In a typical harmonic drive an input shaft rotates a former which has an elliptical external profile. The former deflects cyclically a flexible spline, hereinafter called a flexspline, within its elastic limit so that teeth on the outside of the flexspline mesh with a fixed internal spline in two regions disposed 180° circumferentially. The flexspline, which is connected to an output shaft, has a few teeth (two or a multiple thereof) less than the internal spline and is thus caused to rotate in a sense opposite to that of the former, the distance of those few teeth for each revolution of the former. The gear ratio of this typical drive may be expressed as:

$$G = N_1 : N_2 - N_1 \qquad\qquad X$$

where
G = gear ratio
$N_1$ = the number of teeth on the flexspline
$N_2$ = the number of teeth on the internal spline.

Gear ratios of 60:1 to 120:1 have been obtained with harmonic drives, and such gear ratios make harmonic drives attractive for use with gas turbine engines. Harmonic drives hitherto available however have had a mechanical efficiency less than 90% and have been susceptible to fatique failures. Consequently although harmonic drives have had some industrial and even space applications, multi-stage epicyclic gears have been the most usual means of obtaining such high gear reduction in high performance situations. These however tend to be heavy, particularly when the reduction radio is about 100:1 or more. Worm gears, which are another of the known high reduction ratio gears, tend to have an efficiency less than 85%.

It is an object of the present invention to provide a harmonic drive with significant improvement in efficiency and fatique. These improvements are obtained as a result of attention to the nature of the former and bearings and most importantly to the shape of the teeth.

According to the present invention, therefore, in a harmonic drive of the type defined the teeth on either or both of the flexspline and internal spline have a modified involute profile with a small contact angle when fully meshed and considerable tip relief. By contact angle is meant the angle that part of the flank of the tooth which contacts with maximum working pressure makes with the tooth vertical axis. It should for the purposes of this invention be less than 20° at full enmeshment and is preferably 10° to 15°.

The tip relief may be such that the flank to tip profile is a continuous curve, perhaps of constant radius, extending between the corresponding edges of that part of each flank of the tooth which contacts with maximum working pressure.

It may be advantageous, from the point of view of machining, for the teeth on the flexspline and the internal spline to have similar profiles. Alternatively the tip may further be relieved, in the sense that the teeth of the flexspline may be shorter than those of the internal spline. As far as is known flexspline and internal spline teeth in current harmonic drives have an involute form with a 30° contact angle, and these contact over no more than 12° of a rotation per former lobe. As the power transmission is thereby concentrated on a few teeth at a time the load variation on the flexspline, already affected by its cyclic deformation, is higher than if the enmeshment could take place over a larger angle. With teeth in accordance with the present invention enmeshment and tooth contact can be arranged to occur for up to 120° per former lobe.

Bearing and wear problems can be minimised in a drive the former in which, rather than being elliptical, comprises an eccentric disc system mounted on a cranked input shaft, the size of the discs and the eccentricity being such that the former affords the maximum possible support to the flexspline. It will be appreciated that this is obtained in a former wherein the discs are mounted side by side on a shaft which is cranked in line.

According to a feature of the invention therefore the harmonic drive may have a former comprising three discs in line on an input shaft cranked to a small eccentricity, the centre disc eccentricity being diametrically opposite that of the outside pair. For balance purposes the centre disc may be twice the mass of each of the outside pair. The eccentricity, and hence the size of the disc, is preferably a compromise between the requirement of maximum support for the flexspline, minimum flexspline stress, and the need completely to disengage the teeth for a sufficient fraction of a revolution. Optimum eccentricity, according to another feature of the invention, occurs when:

$$e = \frac{1.1\,\pi D}{2\,G(\pi - 2)} \qquad\qquad Y$$

where
e = eccentricity
D = flexspline undeflected mean tooth diameter
G = Gear ratio.

The flexspline or discs or both may be fabricated so that the outer discs are loaded equally, i.e. the flexspline may be slightly belled inwards or the disc nearer the flexspline closed end may have a slightly smaller diameter than the other outer disc. Plain bearings, with a pressurised oil lubrication system, are employed in preference to rolling element bearings.

It will be appreciated that the optimum tooth profile is one which has been arrived at by taking account of the enmeshment profile obtained with a given former arrangement and a given flexspline deflection profile.

Harmonic drives in accordance with the invention are useful in high performance situations where efficiency and low weight may also be valuable. They may therefore be particularly suitable for use in gas turbine powered helicopters and other aircraft.

Figure 2:
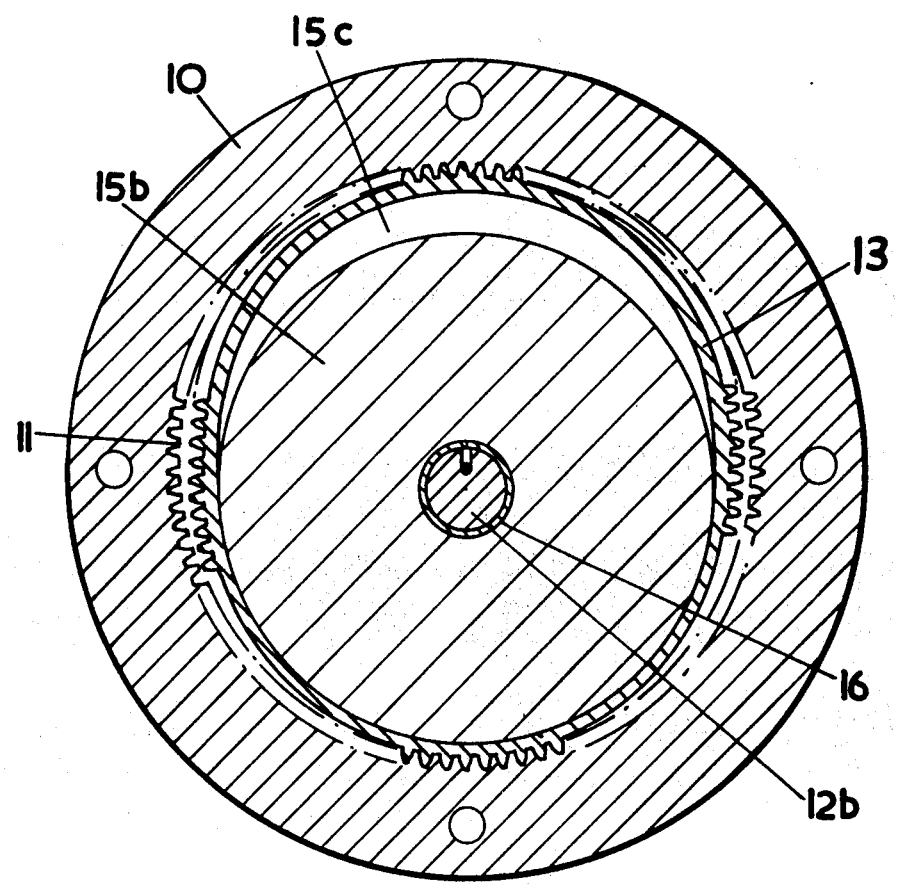
Figure 3A:
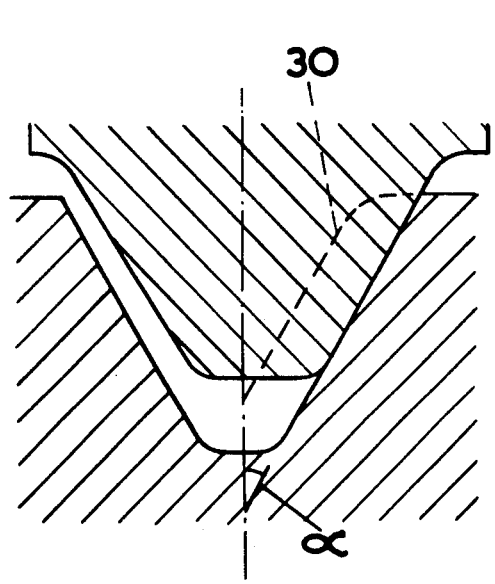
Figures 4, 5:
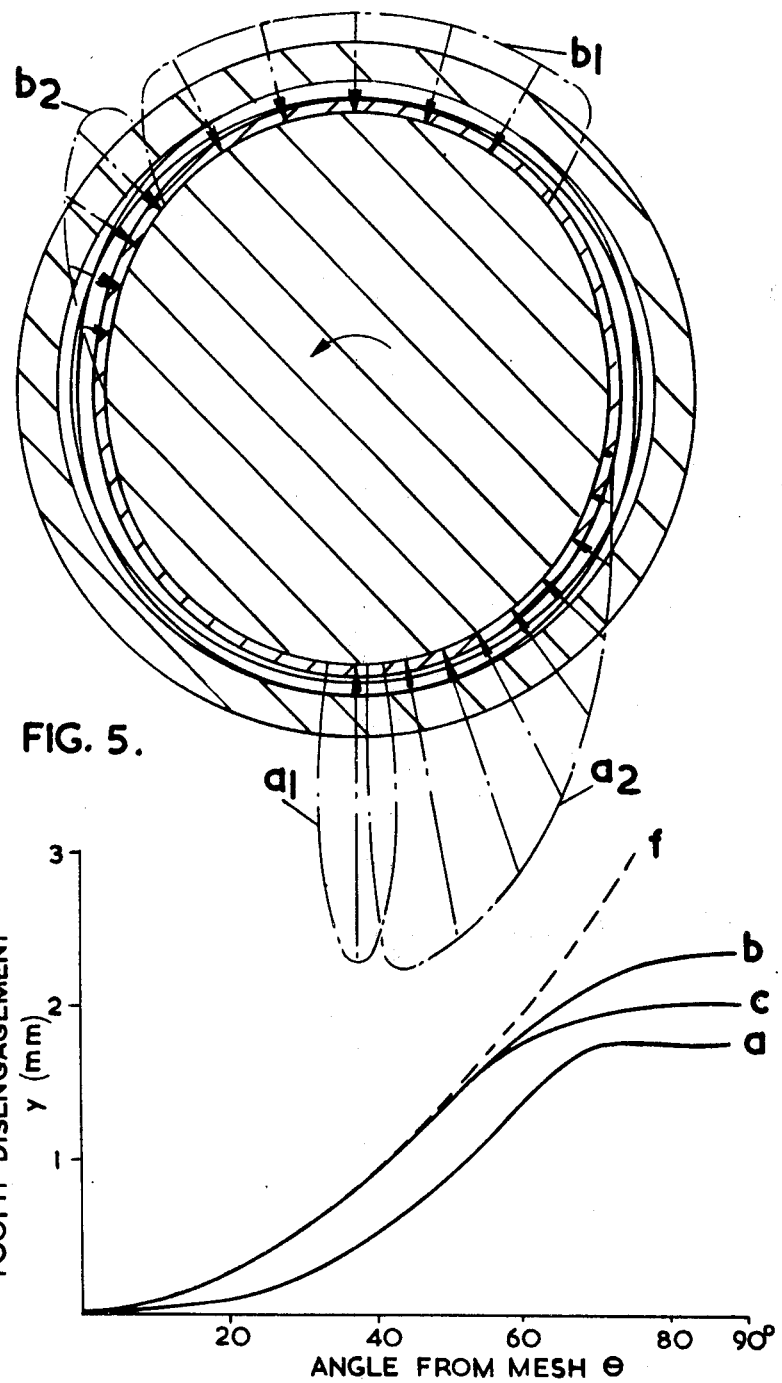

A harmonic drive in accordance with the present invention will now be described, by way of example, with reference to the accompanying drawings, of which:

FIG. 1 is a longitudinal cross section of the drive,
FIG. 2 is a view on II — II in FIG. 1,
FIGS. 3(a) (b) and (c) compare tooth profiles,
FIG. 4 is a graph illustrating tooth enmeshment, and
FIG. 5 is an illustration of stress distribution.

As shown in FIGS. 1 and 2 the drive comprises a housing 10 having an internal spline 11, an input shaft 12 cranked at journals 12 a, b, c, and a flexspline 13 mounted on an output shaft 14. Former lobes comprising three discs 15 a, b, c are rotatably mounted with plain bearings 16 on the journals 12 a, b, c respectively.

There is a pressurized oil system 17 for supplying oil to the bearings 16 inter alia.

The centre disc 15(b) is twice the mass of each of the discs 15(a) and (c) and is cranked in a diametrically opposite position thereto. The eccentricity is determined in accordance with formula Y above. The flexspline 13 is thus deflected and urged into maximum enmeshment with the spline 11 at two diametrically opposite positions. The flexspline has two less teeth than the internal spline 11.

In operation of the drive, rotation of the input shaft 12 causes coincident rotation of the deflection of the flexspline 13 and progressive enmeshment and disenmeshment of its teeth at two diametrically opposite locations. As there are two less teeth on the flexspline than on the fixed spline 11 the flexspline and hence the output shaft 14 rotate in an opposite sense to the input shaft 12 and by two teeth per revolution thereof. The discs 15 a, b, c roll on the inner surface of the flexspline 13 and rotate on their bearings 16 with respect to the journals 12 a, b, c.

Figure 3B:
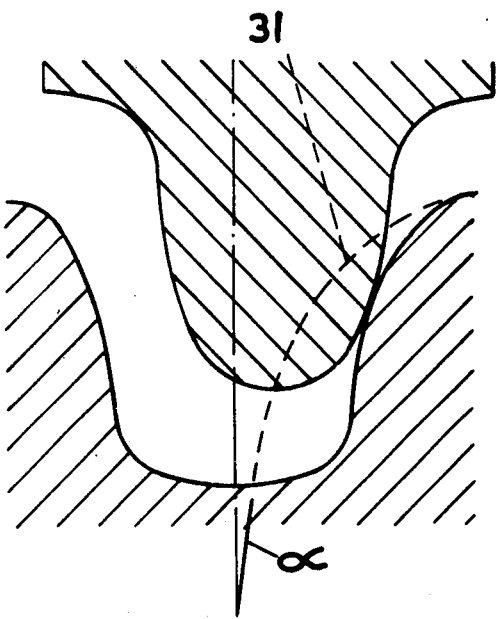

The profile of the teeth of the flexspline 13 and the internal spline 11 is that illustrated in FIG. 3b. This is a modified involute profile which has been arrived at having regard to the former and flexspline deflection profiles. It has a tooth tip flank and root of three substantially constant blending radii. The contact angle $\alpha$ at the part of the flank which engages with maximum working pressure at maximum enmeshment ($\theta = 0$) is about 10°. This is at about the transition between the radius of the root of the tooth and the flank radius. When compared with the traditional harmonic drive gear tooth profile illustrated in FIG. 3a it can be seen that the disengagement locus 31 for the FIG. 3b profile is continuously curved while that 30 for the FIG. 3a profile is substantially straight. The FIG. 3b profile enables a load to be taken by all meshed teeth in the enlarged arc of meshed teeth in accordance with the strain of the material and the degree of enmeshment of each tooth.

Figure 3C:
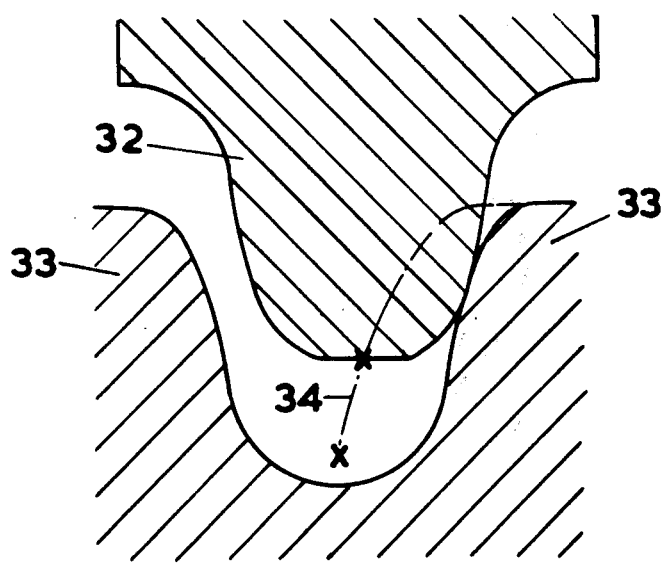

FIG. 3c illustrates an alternative profile in accordance with the invention. A flexspline tooth 32 is shown whose profile is similar to that illustrated in FIG. 3b except that its tip has been flattened, thereby reducing tooth height compared with that of teeth 33 on the internal spline. Also the flank/tip relief of the tooth 32 is modified to obviate discontinuity. The disengagement profile is illustrated at 34.

The extent to which the arc of tooth enmeshment of FIG. 3b and 3c profile teeth is enlarged over that of the traditional tooth is illustrated in FIG. 4. Curve (a) shows the traditional tooth coming out of contact with the former (Curve f) within 5° or 6° of rotation from maximum enmeshment. Curves (b) and (c) show the FIG. 3b and 3c profile teeth remaining in contact with the former until about 50° of rotation from maximum enmeshment, but at $\theta = 90°$ the clearance of the FIG. 3c profile teeth from the internal spline is greater than that of the FIG. 3b profile teeth.

The effect of arc of FIG. 3b profile teeth upon stress in the flexspline is illustrated in FIG. 5, which is a plot of the radial stresses on the former for a flexspline with a traditional profile (Curves a) and for a flexspline with FIG. 3b profile (Curves b). Curve $a_1$ shows a high peak of teeth reaction shear stress over a very limited arc ($\theta = 10°$) and curve $a_2$ a high total torque stress with a peak similar to that of the tooth reaction stress Curve $a_1$. Curve $b_1$ shows a tooth reaction stress evenly spread over the enlarged enmeshment arc ($\theta = 100°$) without a definable peak and never exceeding about one third of the maximum of curve $a_1$.

Curves $b_2$ indicates that the torque stress for the FIG. 3b profile tooth has a maximum about three eights of, and covers an arc much smaller than that for, the traditional profile.

A typical harmonic drive in accordance with the invention, having a gear ratio of 80:1 has 160 flexspline teeth and hence 162 fixed spline teeth. The mean tooth diameter of the flexspline is 198 mm and spline tooth length is 50 mm. The former disc eccentricity is 3.8 mm and the disc diameter 195 mm. The overall diameter and length of the drive are about 250 mm and 500 mm respectively.

I claim:
1. A harmonic drive of the type comprising an input shaft, a former mounted on the shaft, a flexspline surrounding the former and an internal spline surrounding the flexspline, wherein the teeth on at least one of the flexspline and the internal spline have a modified involute profile with a small contact angle when fully meshed and considerable tip relief.
2. A harmonic drive as claimed in claim 1 and wherein the contact angle is between 10° and 15°.
3. A harmonic drive as claimed in claim 1 and wherein the flank to tip profile of each of said teeth is a continuous curve extending between the corresponding edges of that part of each flank of the tooth which contacts with maximum working pressure.
4. A harmonic drive as claimed in claim 3 and wherein the curve is of substantially constant radius.
5. A harmonic drive as claimed in claim 1 and wherein the teeth on one spline are so further tip relieved as to be shorter than the teeth on the other.
6. A harmonic drive as claimed in claim 1 and wherein the former comprises an eccentric disc system on a cranked input shaft, the size of the discs and the eccentricity being arranged so that the former affords substantially the maximum possible support to the flexspline.
7. A harmonic drive as claimed in claim 6 and wherein the former comprises three discs in line on the input shaft, the centre disc eccentricity being diametrically opposite that of the outside pair.
8. A harmonic drive as claimed in claim 7 and wherein the centre disc has twice the mass of each of the outside pair.
9. A harmonic drive as claimed in claim 6 and wherein:-

$$\text{eccentricity} = \frac{1 \cdot 1 \pi D}{2 \ G(\pi - 2)}$$

where D = flexspline undeflected mean tooth diameter and G = gear ratio.

10. A harmonic drive as claimed in claim 1 comprising plain bearings and a pressurized oil system therefor.
11. A harmonic drive comprising an input shaft, a former mounted on the shaft, a flexspline surrounding the former, and an internal spline surrounding the flexspline, there being a few less teeth on the flexspline than on the internal spline and the flexspline being arranged to be cyclically deformable by the former so that teeth in a protruded portion of the flexspline can mesh with teeth on the internal spline, the teeth on at least one of the splines having a modified involute profile with a contact angle when fully meshed of between 10° and 15° and a flank to tip profile of substantially constant radius extending between the corresponding edges of that part of each flank of the tooth which in use contacts with maximum working pressure.

12. A harmonic drive as claimed in claim 11 and wherein the input shaft is cranked, the former comprises three discs in line, the centre disc eccentricity being diametrically opposite that of the outside pair, and the $$\text{eccentricity} = \frac{1}{2} \cdot \frac{1 \cdot 1 \pi D}{G(\pi - 2)}$$

where D = flexspline undeflected mean tooth diameter and G = gear ratio.

* * * * *